United States Patent

Kim

[11] Patent Number: 5,836,418
[45] Date of Patent: Nov. 17, 1998

[54] ELECTRONIC CONTROLLED POWER STEERING APPARATUS

[75] Inventor: Younggab Kim, Kyungsangnam-do, Rep. of Korea

[73] Assignee: Hyundai Motor Company, Seoul, Rep. of Korea

[21] Appl. No.: 702,115

[22] Filed: Aug. 23, 1996

Related U.S. Application Data

[63] Continuation-in-part of Ser. No. 405,180, Mar. 16, 1995, abandoned.

[30] Foreign Application Priority Data

Mar. 16, 1994 [KR] Rep. of Korea ......................... 94-5242

[51] Int. Cl.$^6$ ..................................................... B62D 5/00
[52] U.S. Cl. ........................... 180/422; 180/421; 701/41
[58] Field of Search ....................... 701/41, 42; 180/400, 180/421, 422, 423, 444, 446

[56] References Cited

U.S. PATENT DOCUMENTS

| | | |
|---|---|---|
| 4,730,687 | 3/1988 | Chikuma et al. . |
| 4,858,134 | 8/1989 | Eto et al. . |
| 5,064,014 | 11/1991 | Ishizaka et al. ......................... 180/422 |
| 5,253,728 | 10/1993 | Matsuno et al. . |
| 5,259,473 | 11/1993 | Nishimoto . |
| 5,343,392 | 8/1994 | Ishizaka et al. ......................... 180/422 |
| 5,446,660 | 8/1995 | Miichi et al. . |
| 5,487,007 | 1/1996 | Suzuki et al. ........................... 180/422 |

Primary Examiner—Daniel G. DePumpo

[57] ABSTRACT

An electronic controlled power steering apparatus is disclosed, in which the force required for manipulating the steering wheel is varied in accordance with not only the velocity of an automobile and but also with the steering angle, so that safety will be ensured during the running of an automobile. When sensing signals for the velocity of an automobile is other than normal, the force required for manipulating the steering wheel is maintained at a constant value regardless of the running state of the automobile, whereby an erroneous operation such that the force required for manipulating the steering wheel is varied by an abnormal velocity sensing signal is prevented.

15 Claims, 3 Drawing Sheets

ELECTRONIC CONTROLLED POWER STEERING APPARATUS

This application is a continuation-in-part of application Ser. No. 08/405,180 filed on Mar. 16, 1995, now abandoned, the entire contents of which are hereby incorporated by reference.

BACKGROUND OF THE INVENTION

(1) Field of the Invention

The present invention relates to an electronic controlled power steering apparatus in which the steering of the power steering apparatus can be controlled by taking into account not only the running velocity of an automobile but also the steering angle.

(2) Description of the Prior Art

In the case of a large vehicle or an automobile using low pressure tires, the treading resistance of the front wheels is increased, and therefore, a large steering force for the front wheels is required, with the result that the driver cannot perform a quick steering action. Further, more recently, in accordance with an FF (front engine front wheel drive) trend and a widening of the width of tires, a large steering force is required on the steering wheel, with the result that a great load is imposed on the driver in carrying out the steering.

In order to alleviate the load of the driver and to make the steering action quick and the steering system compact, a pressure increasing device is installed on a path through which the steering force is transmitted. Thus the force required for steering the steering apparatus is alleviated by the help of this pressure increasing device, and such a power steering apparatus is installed on automobiles. Generally, the pressure increasing device is actuated by a hydraulic pressure which is generated by a hydraulic pump which is driven by an engine.

However, the power steering system as described above is designed such that the higher the engine RPM is, the lighter the steering force of the steering system is.

Therefore, in the power steering apparatus in which the pressure increase is constantly maintained, when the automobile runs fast, the power steering wheel becomes too light, so that an accident may be caused.

In an attempt to overcome the above described problem, an electronic controlled power steering apparatus is devised and put to the practical use, in which a micro-processor adjusts the force required for manipulating the steering wheel in accordance with the running velocity of the automobile and the revolution speed of the engine.

In the above described conventional electronic controlled power steering apparatus, data of the state of the automobile such as the velocity of the automobile, the variation of the revolution speed of the engine and the like are inputted into a micro-processor. Then the micro-processor outputs control signals so that the internal pressure of a cylinder can be adjusted to a proper level in accordance with the state of the automobile as judged by the micro-processor. Thus, the force required for manipulating the steering wheel is properly varied.

However, the above described conventional electronic controlled power steering apparatus controls the steering force by considering only the velocity of the automobile and the revolution speed of the engine. It does not consider the steering angle in varying the steering force, and therefore, if the velocity of the automobile or the revolution speed of the engine is abruptly varied, then the manipulating state of the steering wheel is also varied, this being a disadvantage.

In this case, the driver manipulates the steering wheel without recognizing the sudden change in the steering force, and therefore, the steering wheel can be turned through a large angle with a small force.

During a high velocity running, if the steering wheel is turned through a large angle against the driver's intention due to a sudden change in the steering force, then the running direction of the automobile is abruptly changed to impede the running of other automobiles, or to cause a collision or a contact accident, with the possible result that property damages are caused, or that human lives may be sacrificed.

In a severe case, the center line of the road may be intruded, or a departure from the lane may be done without issuing any warning signal due to the sudden turning of the steering wheel, so as to cause a big accident.

SUMMARY OF THE INVENTION

The present invention is intended to overcome the above described disadvantages of the conventional techniques.

Therefore it is an object of the present invention to provide an electronic controlled power steering apparatus in which the force required for manipulating the steering wheel is varied in accordance with not only the velocity of an automobile and but also with the steering angle, so that safety will be ensured during the running of an automobile.

It is another object of the present invention to provide an electronic controlled power steering apparatus in which, when sensing signals for the velocity of an automobile is other than normal, the force required for manipulating the steering wheel is maintained at a constant value regardless of the running state of the automobile, whereby an erroneous operation such that the force required for manipulating the steering wheel is varied by an abnormal velocity sensing signal is prevented.

In achieving the above objects, the electronic controlled power steering apparatus according to the present invention includes:

a power supply section for supplying a power;

automobile velocity sensing unit for sensing a velocity of an automobile to convert it into electrical signals;

angle sensing unit for sensing a steering angle of a steering wheel to convert it into electrical signals;

a micro-controller connected to the automobile velocity sensing unit and to the angle sensing unit, for outputting data control signals to set a power steering hydraulic pressure by utilizing a data set in accordance with automobile velocity signals supplied from the automobile velocity sensing unit, and by utilizing a data set in accordance with steering angle signals supplied from the angle sensing unit; and hydraulic control unit connected to the micro-controller, for varying cycles of the data control signals by means of voltages determined in accordance with values of the data control signals output from the micro-controller to control a coil current, thereby varying an opening degree of a solenoid valve.

BRIEF DESCRIPTION OF THE DRAWINGS

The above objects and other advantages of the present invention will become more apparent by describing in detail the preferred embodiment of the present invention with reference to the attached drawings in which.

DETAILED DESCRIPTION OF THE PREFERRED EMBODIMENTS

Figure 1A:
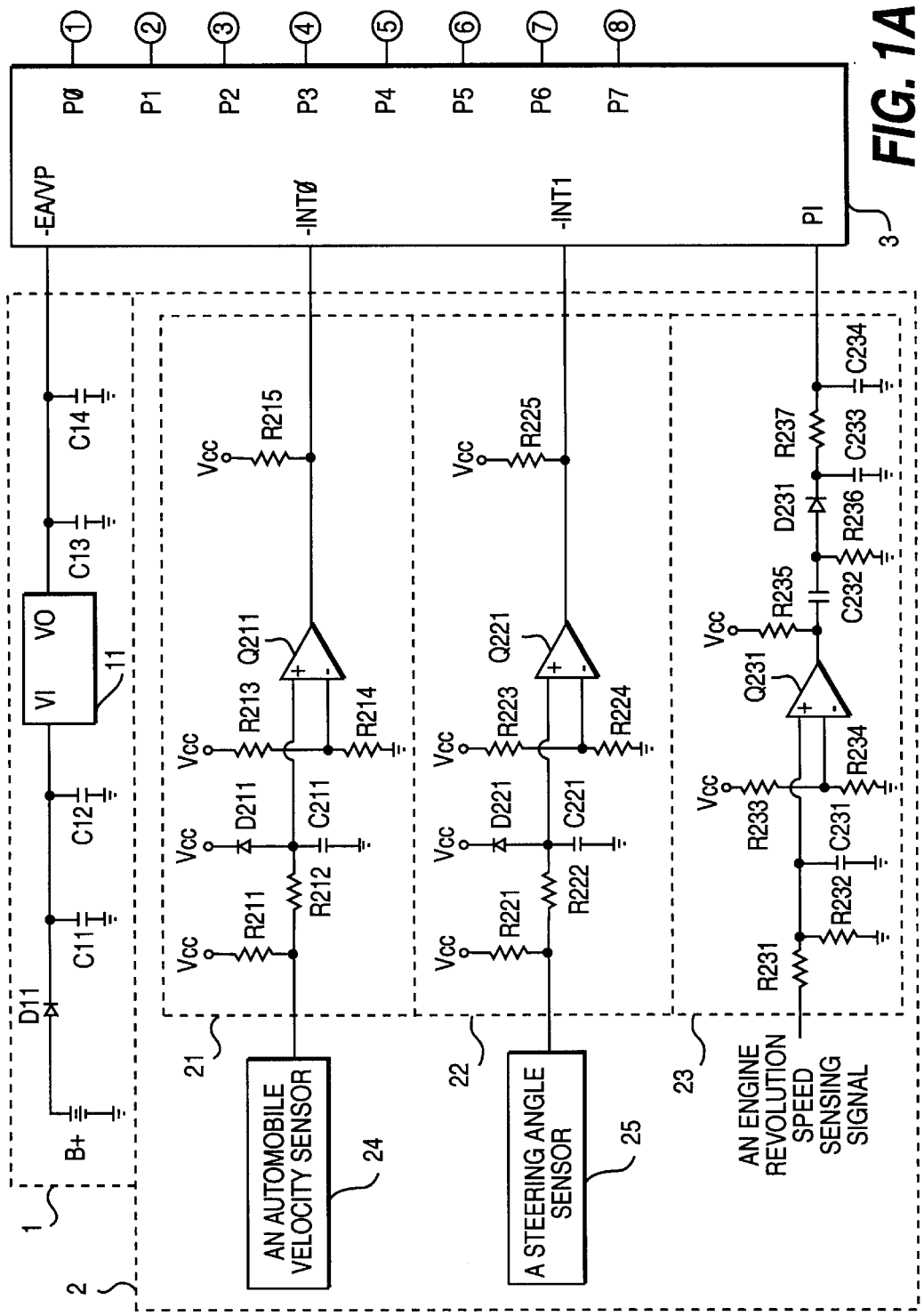
FIGS. 1A and 1B illustrate in detail the circuits of the electronic controlled power steering apparatus according to the present invention.
Figure 1B:
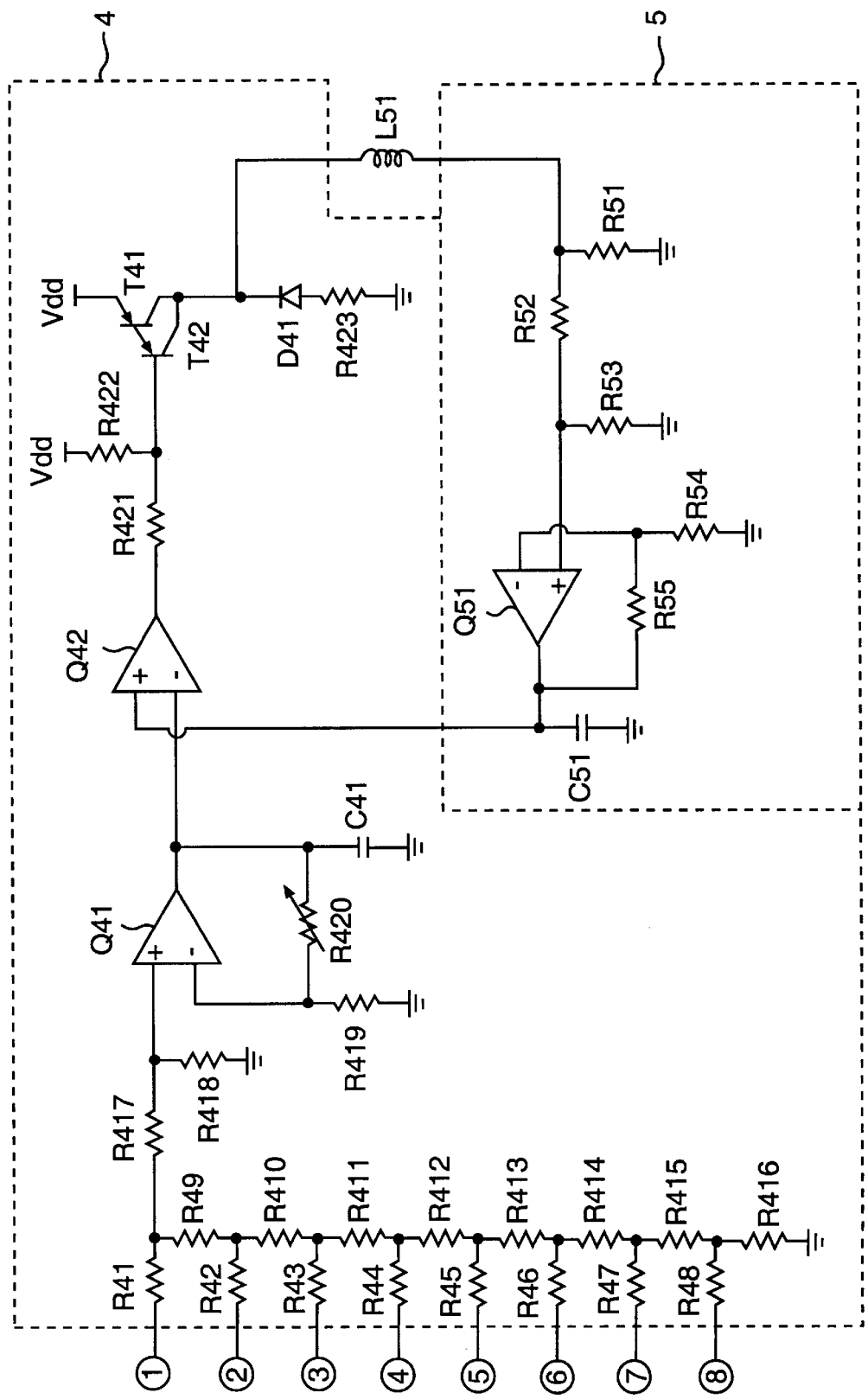

FIGS. 1A and 1B illustrate in detail the circuits of the electronic controlled power steering apparatus according to the present invention.

As shown in FIGS. 1A and 1B, the electronic controlled power steering apparatus according to the present invention includes: a power supply section 1 for supplying the power required for operation of the power steering apparatus; a sensed signal supply section 2 for sensing the velocity of an automobile, the steering angle and the revolution speed of the engine to convert them into electrical signals; a micro-controller 3 connected to the power supply section 1 and to the sensed signal supply section 2, for outputting control signals to vary the steering force of the power steering apparatus; a hydraulic control section 4 connected to the micro-controller 3, for setting an output voltage in accordance with the data outputted from the micro-controller 3, and for varying the cycles of the control signals; a solenoid valve coil L51 with its electric current varied in accordance with the cycles of the control signals of the hydraulic control section 4; and an error compensating section 5 connected to the solenoid valve coil L51, for feeding back an information on a voltage supplied to the solenoid valve coil L51 so as to compensate for hydraulic control errors caused by a deterioration of the solenoid valve coil L51 as can be judged by a variable resistance value.

The power supply section 1 includes: a battery B+; diode D11 with its anode connected to the battery B+; capacitors C11 and C12, each having one terminal connected to a cathode of the diode D11, and another terminal grounded; a voltage regulator 11 with its input terminal VI connected to one terminal each of the capacitors C11 and C12; and capacitors C13 and C14 each having terminal connected to a connection point of an output terminal VO of the voltage regulator 11 and a power source terminal -EA/VP of the micro-controller 3, and with another terminal grounded.

The sensed signal supply section 2 includes: an automobile velocity sensor 24; an automobile velocity signal processing section 21 connected to the output terminal of the automobile velocity sensor 24; a steering angle sensor 25; a steering angle signal processing section 22 connected to the output terminal of the steering angle sensor 25; and an engine revolution speed signal processing section 23.

The automobile velocity signal processing section 21 and the steering angle signal processing section 22 have the same form of circuits and therefore, only the automobile velocity signal processing section 21 will be described so as to avoid overlapping descriptions.

The automobile velocity signal processing section 21 includes: a resistor R211 with its one terminal connected to a power source Vcc, and with its other terminal connected to the automobile velocity sensor 24; a resistor R212 with its one terminal connected to the automobile velocity sensor 24; a diode D211 with its cathode connected to the power source Vcc, and with its anode connected to another terminal of the resistor R212; a capacitor C211 with its one terminal connected to the anode of the diode D211, and with its other terminal grounded; a resistor R213 with its one terminal connected to the power source Vcc; a resistor R214 with its one terminal connected to another terminal of the resistor R213, and with its other terminal grounded; an arithmetic amplifier Q211 with its non-inverting terminal connected to another terminal of the resistor R212, with its inverting terminal connected to a common terminal of the resistors R213 and R214, and with its output terminal connected to a first interrupt terminal; -INT0 of the micro-controller 3; and a resistor R215 with its one terminal connected to the output terminal of the arithmetic amplifier Q211, and with its other terminal connected to the power source Vcc.

The engine revolution speed signal processing section 23 includes: a resistor R231 for receiving engine revolution speed sensing signals into its one terminal; a resistor R232 with its one terminal connected to another terminal of the resistor R231, and with its other terminal grounded; a capacitor C231 with its one terminal connected to the other terminal of the resistor R231, and with its other terminal grounded; a resistor R233 with its one terminal connected to the power source Vcc; a resistor R234 with its one terminal connected to another terminal of the resistor R233, and with its other terminal grounded; an arithmetic amplifier Q231 with its non-inverting terminal connected to the other terminal of the resistor R231, and with its inverting terminal connected to a common terminal of the resistors R233 and R234; a resistor R235 with its one terminal connected to an output terminal of the arithmetic amplifier Q231, and with its other terminal connected to the power source Vcc; a capacitor C232 with its one terminal connected to the output terminal of the arithmetic amplifier Q231; a resistor R236 with its one terminal connected to another terminal of the capacitor C232, and with its other terminal grounded; a diode D231 with its anode connected to the other terminal of the capacitor C232; a capacitor C233 with its one terminal connected to a cathode of the diode D231, with its other terminal grounded; a resistor R237 with its one terminal connected to the cathode of the diode D231, and with its other terminal connected to an input terminal PI of the micro-controller 3; and a capacitor C234 with its one terminal connected to another terminal of the resistor R237, and with its other terminal grounded.

The hydraulic control section 4 includes: resistors R41–R48 each having one terminal connected to output terminals P0–P7 of the micro-controller 3 respectively; resistors R49, and R410–R416 with their both terminals each of them connected to the opposite terminals each of the resistors R41–R48; a resistor R417 with its one terminal connected to another terminal of the resistor R41; a resistor R418 with its one terminal connected to another terminal of the resistor R417, and with its other terminal grounded; an arithmetic amplifier Q41 with its non-inverting terminal connected to the other terminal of the resistor R417; a resistor R419 with its one terminal connected to an inverting terminal of the arithmetic amplifier Q41, and with its other terminal grounded; a variable resistor R420 with its one terminal connected to one terminal of the resistor R419, and with its other terminal connected to an output terminal of the arithmetic amplifier Q41; a capacitor C41 with its one terminal connected to another terminal of the variable resistor R420, and with its other terminal grounded; an arithmetic amplifier Q42 with its inverting terminal connected to an output terminal of the arithmetic amplifier Q41; a resistor R421 with its one terminal connected to an output terminal of the arithmetic amplifier Q42; a resistor R422 with its one terminal connected to a power source Vdd, and with its other terminal connected to another terminal of the resistor R421; a transistor T41 with its emitter connected to the power source Vdd; a transistor T42 with its emitter connected to a base of the transistor T41, with its base connected to another terminal of the resistor R421, and with its collector connected to a collector of the transistor T41; a diode D41 with its cathode connected to a collector of the transistor T42 and to one terminal of the solenoid valve coil L51; and a resistor R423 with its one terminal connected to an anode of the diode D41, and with its other terminal grounded.

The error compensating section 5 includes: a resistor R51 with its one terminal connected to another terminal of the solenoid valve coil L51, and with its other terminal grounded; a resistor R52 with its one terminal connected to one terminal of the resistor R51; a resistor R53 with its one terminal connected to another terminal of the resistor R52, and with its other terminal grounded; an arithmetic amplifier Q51 with its non-inverting terminal connected to one terminal of the resistor R53; a resistor R54 with its one terminal connected to an inverting terminal of the arithmetic amplifier Q51, and with its other terminal grounded; a resistor R55 with its one terminal connected to one terminal of the resistor R54, and with its other terminal connected to an output terminal of the arithmetic amplifier Q51; and a capacitor C51 with its one terminal connected to the output terminal of the arithmetic amplifier Q51 and to a non-inverting terminal of the arithmetic amplifier Q42 of the hydraulic control section 4, and with its other terminal grounded.

Figure 2:
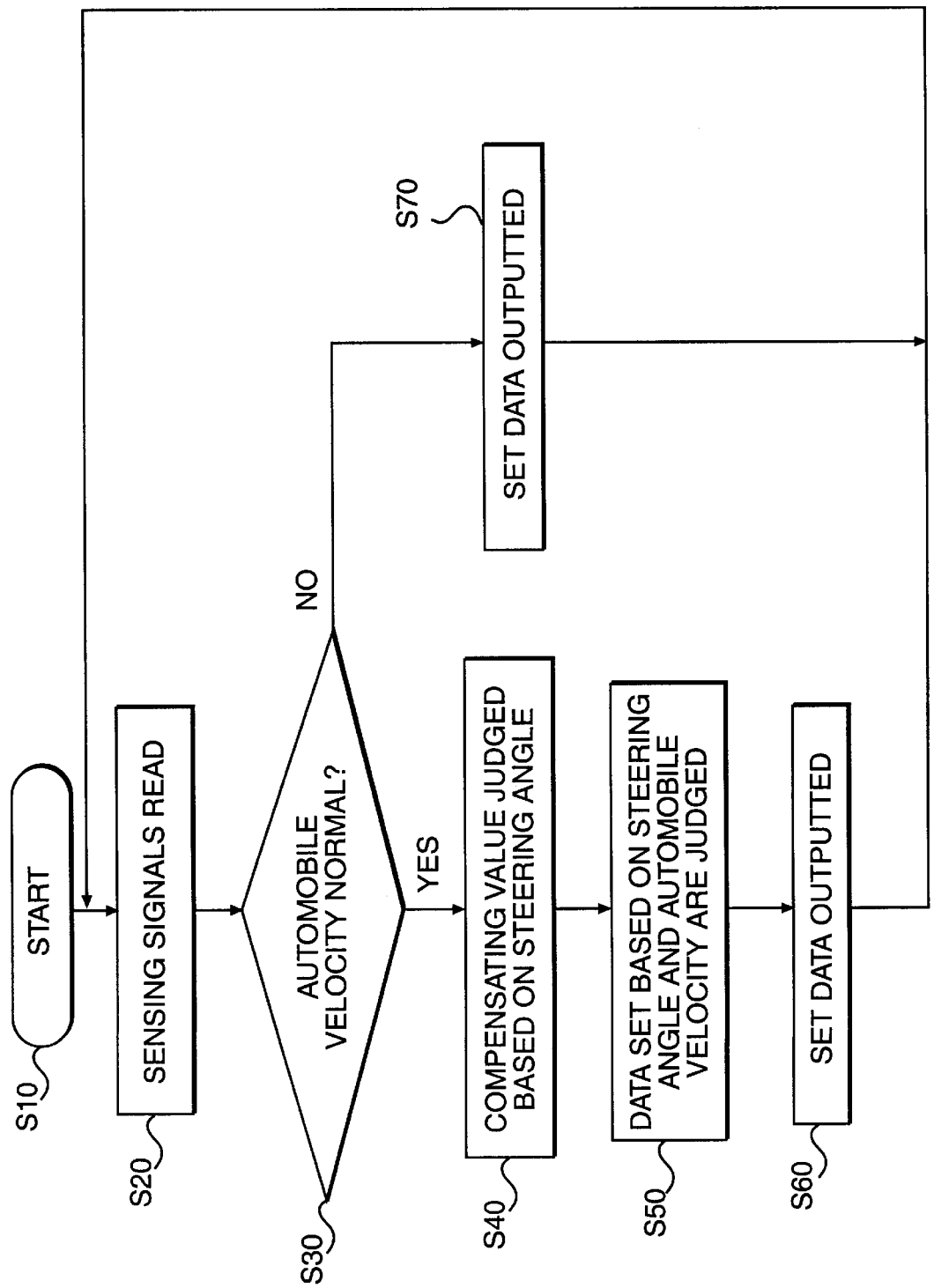
FIG. 2 is a flow chart showing the operation of the electronic controlled power steering apparatus according to the present invention.

FIG. 2 is a flow chart showing the operation of the electronic controlled power steering apparatus according to the present invention.

The electronic controlled power steering apparatus of the present invention constituted as above will now be described as to its operations.

When power is supplied from the battery B+ of the power supply section 1 by the driver, the electronic controlled power steering apparatus according to the present invention is activated.

The power which is outputted from the battery B+ of the power supply section 1 is transmitted through the diode D11 so that a reverse flow is prevented. Then it is filtered by the capacitors C11 and C12, and then, is inputted into the input terminal VI of the voltage regulator 11.

The voltage regulator 11 modifies the voltage of the battery B+ to fit the required form, and outputs it through the output terminal VO.

The signals which are outputted from the voltage regulator are filtered by the capacitors C13 and C14, and then, are supplied to the power source terminal -EA/VP of the micro-controller 3, whereby the micro-controller 3 is placed in an operable state.

When the micro-controller 3 becomes operable by the power supply section 1 as described above (S10), and when the power sources Vcc and Vdd are supplied to the relevant portions so as to be operable, the micro-controller 3 reads the sensed automobile velocity signals, the sensed steering angle signals and the sensed engine revolution speed signals through first and second interrupt terminals -INT0 and -INT1, and the input terminal PI, to make judgments on them (S20).

Now more detailed operations of the sensed signal supply section 2 will be described.

First, frequency-variable pulse signals are outputted from the automobile velocity sensor 24 and the steering angle sensor 25 in accordance with the automobile velocity and the steering angle. These pulse signals first are filtered by the automobile velocity signal processing section 21, and by the resistors R211, R212, R221 and R222 and the capacitors C211 and C221 of the steering angle signal processing section 22. Then the signals are supplied to the non-inverting terminals of the arithmetic amplifiers Q211 and Q221.

The inverting terminals of the arithmetic amplifiers Q211 and Q221 receive reference signals which are set by the resistors R213, R214, R223 and R224 which divide the power voltage Vcc.

If a voltage larger than the reference voltage is supplied to the non-inverting terminals of the arithmetic amplifiers Q211 and Q221, then high level signals, i.e., "H" signals are outputted from the output terminals of the arithmetic amplifiers Q211 and Q221. If a voltage smaller than the reference voltage is supplied to the non-inverting terminals of the arithmetic amplifiers Q211 and Q221, then low level signals, i.e., "L" signals are outputted from the output terminals of the arithmetic amplifiers Q211 and Q221.

That is, the unnecessary components of the signals which have not been filtered at the first stage are removed by the arithmetic amplifiers Q211 and Q221 which use comparators. Then, pulse signals which correspond to the automobile velocity and the steering angle are supplied to the micro-controller 3, so that an accurate control can be carried out.

As to the engine revolution speed sensing signals which are supplied to the engine revolution speed signal processing section 23, pulse signals having a certain frequency are outputted from the arithmetic amplifier Q231 which is operated through the resistors R231–R234 and the capacitor C231, like the operations of the automobile velocity signal processing section 21 and the steering angle signal processing section 22. Then the pulse signals are converted into a voltage corresponding to the magnitude of the frequency by the resistors R236 and R237 and the capacitors C233 and C234 which function as an integrator.

Therefore, the pulse signals of the arithmetic amplifier Q231 of the engine revolution speed signal processing section 23 are converted into voltage signals by the resistors R235 and R236 and the capacitor C232 which function as an integrator. Then the signals are supplied through the diode D231 and the resistor R237 to the input terminal PI of the micro-controller 3.

Based on the above described operations, the sensed signals of the steering angle sensor 25 and the automobile velocity sensor 24 of the sensed signal supply section 2, as well as the engine revolution speed sensing signals supplied from the external, are converted into relevant pulse signals or into voltages to be supplied to the micro-controller 3.

The micro-controller 3 reads the sensed automobile signals, the sensed steering angle signals and the sensed engine revolution speed signals which are supplied from the sensed signal supply section 2. That is, the micro-controller 3 reads the voltages corresponding to the above signals over a set time period.

Then the micro-controller 3 makes a judgment as to whether the sensed automobile velocity signals which are outputted from the automobile sensor 24 and supplied through the automobile velocity signal processing section 21 are of normal state (S30).

If the voltage value corresponding to the sensed engine revolution speed is some revolution speed which is higher than that of an engine in idle state; but the automobile velocity, as judged by the sensed velocity signals, show a stopped state or no velocity, then the micro-controller 3 judges that the sensed automobile velocity signals output from the automobile velocity sensor 24 are of an abnormal state. For example, in case that the sensed engine revolution speed is 2300 RPM (Revolution Per Minute), and the automobile velocity sensed by the automobile velocity sensor is 0 KPH (Kilometer Per Hour) for more than one minute, the micro-controller 3 judges the automobile velocity sensor 24 as being abnormal.

However, if the voltage supplied by the engine revolution speed signal processing section 23 shows some revolution, and if the sensed automobile velocity signals of the automobile velocity signal processing section 21 show some velocity, then the micro-controller 3 judges that the sensed automobile velocity signals of the automobile velocity sensor 24 are of a normal state.

If the output signals of the automobile velocity sensor 24 are of a normal state, the micro-controller 3 reads the sensed steering angle signals which are outputted from the steering angle sensor 25 and are supplied through the steering angle signal processing section 22. Then the micro-controller 3 judges on the compensating value which is set in advance in accordance with the steering angle correspondingly with the above sensed steering angle signals (S40).

Then the micro-controller 3 judges on the output data which is set in advance based on the respective data in accordance with the automobile velocity and the steering angle (S50). Then the micro-controller 3 outputs the output data through the output terminals P0–P7 (S60).

Under this condition, the output data, which are set in accordance with the automobile velocity and the compensating value corresponding to the steering angle, belong to the data which come within a range of OH–FFH.

However, if the automobile velocity is of an abnormal state, and if the sensed automobile velocity signals of the automobile velocity signal processing section are of an abnormal state, the micro-controller 3 outputs the respective output data through the output terminals P0–P7, so that the steering force can be maintained at a certain state set in advance regardless of the automobile velocity and the steering angle (S70).

In this case, if sensed signals corresponding to the exact automobile velocity are not supplied due to an abnormality in the automobile velocity sensor 24 as described above, the micro-controller 3 fixes the steering force to a certain level. In this way, it is prevented that the driver encounters a difficulty in carrying out the steering due to the variation of the steering force by an erroneous automobile velocity sensing signals. Further, it is also prevented that the steering is done against the intention of the driver due to the fact that too small a steering force is required.

When the output data for the automobile velocity and the steering angle are outputted from the micro-controller 3 to the hydraulic control section 4, the voltages corresponding to the output data are determined by the resistors R41–R49 and R410–R416 which are connected in the form of a ladder to the output terminals P0–P7 of the micro-controller 3. These voltages are supplied through the resistors R417 and R418 to the non-inverting terminal of the arithmetic amplifier Q41.

These voltages which are supplied to the non-inverting terminal of the arithmetic amplifier Q41 correspond to the voltages of the output signals which have been fed back through the variable resistor R420 and the resistor R419 and the capacitor C41 into the non-inverting terminal of the arithmetic amplifier Q41.

The pulse signals which are outputted from the arithmetic amplifier Q41 (which includes a comparator) are supplied to the inverting terminal of the arithmetic amplifier Q42 of the next stage, so that they can be used as the reference voltages.

The output signals of the arithmetic amplifier Q42 are supplied through a resistor R421 to the base of the Darlington transistors T42 and T41, thereby controlling the turn-on/off of the Darlington transistors T42 and T41.

In accordance with the cycles of the turning-on/off of the Darlington transistors T42 and T41, the current flowing through the solenoid valve coil L51 is varied.

If the current flowing through the solenoid valve coil L51 is varied, then, in accordance with the state of the current flowing through the solenoid valve coil L51, the state of the solenoid valve Which controls the flow of the hydraulic fluid is varied, with the result that the pressure of the power cylinder of the power steering apparatus is varied in accordance with the running state of the automobile and the steering angle of the steering wheel.

Therefore, when the driver manipulates the steering wheel, the driver feels a proper weight all the time.

Under this condition, in controlling the operation state of the solenoid valve which is for varying the flow of the hydraulic fluid, the solenoid valve coil L51 undergoes a variation of its own resistance owing to the generation of heat which is caused by the current flowing through the solenoid valve coil L51. If the resistance is varied, the solenoid valve cannot operate accurately.

In order to compensate the operating errors which are caused by the heat generation of the solenoid valve coil L51, the current flowing through the solenoid valve coil L51 is supplied through the resistors R51–R53 of the error compensating section 5 to the non-inverting terminal of the arithmetic amplifier Q51.

The output signals of the arithmetic amplifier Q51 are fed back through the resistors R55 and R54 to the inverting input terminal of the arithmetic amplifier Q51. The output terminal of the arithmetic amplifier Q51 is connected to the non-inverting input terminal of the arithmetic amplifier Q42 of the hydraulic control section 4.

If the output state of the arithmetic amplifier Q51 is varied in accordance with the variation of the resistance value due to the heat generation in the solenoid valve coil L51, then the varied output signals of the arithmetic amplifier Q51 are supplied to the non-inverting input terminal of the arithmetic amplifier Q42 of the hydraulic control section 4. Then the output signals of the arithmetic amplifier Q42 are supplied to the bases of the Darlington transistors T42 and T41.

Under this condition, the turn-on/off cycles of the Darlington transistors T42 and T41 are varied, so that the current flowing through the solenoid valve coil L51 can be adjusted in accordance with the heat generation state of the solenoid valve coil L51.

Thus, owing to the variation of the resistance value as a result of the heat generation in the solenoid valve coil L51, the operation state of the solenoid valve can be varied, so that the variation of the steering force can be prevented.

According to the present invention as described above, the electronic controlled power steering apparatus is hydraulically controlled by taking into account not only the automobile velocity but also the steering angle of the steering wheel, so that there can be prevented a steering error due to a sudden variation in the steering force because of a sudden variation in the automobile velocity.

Further, if the automobile velocity sensor is in an abnormal state, the steering force is fixed regardless of the running state of the automobile, so that the variation of the steering force in an abnormal manner can be prevented.

Further, even if the solenoid valve coil is deteriorated, the errors caused by the variation of the resistance value can be compensated, and therefore, the steering wheel can be controlled with an exact steering force.

What is claimed is:

1. An electronic controlled power steering apparatus, comprising:
   a power supply section for supplying power to said power steering apparatus;
   automobile velocity sensing means for sensing a velocity of an automobile and converting the sensed velocity into electrical velocity signals;
   steering angle sensing means for sensing a steering angle of a steering and converting the sensed steering angle into electrical angle signals;
   engine revolution speed sensing means for sensing a revolution speed of the engine and converting the sensed revolution speed into electrical revolution signals; and
   a micro-controller receiving said electrical velocity signal, said electrical angle signals and said electrical revolution signal, said micro-controller including
      determining means for determining whether said electrical velocity signals appropriately correspond to said electrical revolution signals,
      means for outputting data control signals corresponding to an optimum power steering hydraulic pressure in accordance with the electrical velocity signals the electrical angle signals when said determining means determines that said electrical velocity signals and said electrical revolution signals correspond appropriately, and
      means for outputting data control signals corresponding to a predetermined constant power steering hydraulic pressure when said determining means determines that said electrical velocity signals and said electrical revolution signals do not correspond appropriately, thereby maintaining a constant steering angle force with a constant power steering hydraulic pressure.

2. The electronic controlled power steering apparatus as claimed in claim 1, wherein electrical signals corresponding to revolutions of an engine are converted into voltages to be supplied to said micro-controller.

3. The electronic controlled power steering apparatus as claimed in claim 1, wherein, if said automobile velocity sensing means is in an abnormal operating state in which it is determined that the automobile velocity is not sensed and the engine revolution speed is sensed, said micro-controller outputs data signals which are set independently of automobile velocity sensing signals and steering angle sensing signals.

4. The electronic controlled power steering apparatus as claimed in claim 1, wherein, if the engine revolution speed sensing means senses engine revolution at a certain speed, and if the automobile runs at a velocity lower than a pre-set value, then said micro-controller determines that said automobile velocity sensing means is in the abnormal operating state.

5. The electronic controlled power steering apparatus as claimed in claim 1, wherein
   said hydraulic control means is operatively connected to said micro-controller, for varying cycles of the data control signals by means of their voltages, the cycles of the data control signals controlling a coil current of a corresponding solenoid valve coil for a solenoid valve such that the coil current varies an opening degree of the solenoid valve; and
   said solenoid valve coil for controlling closing/opening of said solenoid valve being in accordance with the data control signals supplied to said hydraulic control means.

6. The electronic controlled power steering apparatus as claimed in claim 5, wherein, in order to compensate erroneous operations caused by a deterioration of said solenoid valve coil caused by a variation of resistance value of said solenoid valve coil due to a heat generation in said solenoid valve coil by currents supplied from said hydraulic control means, an error compensating means varies cycles of the data control signals of said hydraulic control means by a feedback current flowing through said solenoid valve coil.

7. The electronic controlled power steering apparatus as claimed in claim 6, wherein said error compensating means comprises:
   an arithmetic amplifier Q51 for receiving currents of varying voltages into one terminal thereof from said solenoid valve coil, said currents flowing through resistors R51, R52 and R53; and
   a pair of resistors R54–R55 connected to an output terminal and another input terminal of said arithmetic amplifier Q51 and grounded, for setting a voltage supplied to the another terminal of said arithmetic amplifier Q51.

8. The electronic controlled power steering apparatus as claimed in claim 5, wherein said hydraulic control means comprises:
   a plurality of resistors R41–R49 and R410–R416 connected to a plurality of corresponding output terminals P0–P7 of said micro-controller, for deciding voltages corresponding to output data;
   an arithmetic amplifier Q41 for receiving into one terminal thereof a voltage set by resistors R417 and R418, and for feeding back its own output through resistors R419 and R420 into another terminal thereof;
   an arithmetic amplifier Q42 for receiving output signals of said arithmetic amplifier Q41 into one terminal thereof to use them as a reference voltage, and for receiving an output voltage of an error compensating means into another terminal thereof, to compare said two voltages; and
   switching means T51 and T52 for controlling the current supplied to said solenoid valve coil L51, the opening degree of said solenoid valve being controlled by output signals of said arithmetic amplifier Q42.

9. The electronic controlled power steering apparatus as claimed in claim 8, wherein the plurality of said resistors R41–R49 and R410–R416 are connected with the resistors R410–R416 alternately interposed between the resistors R41–R49, respectively.

10. A method for controlling power steering apparatus, comprising the steps of:
   supplying power to the power steering apparatus;
   sensing a velocity of an automobile and converting the sensed velocity into electrical velocity signals;
   sensing a steering angle of a steering wheel and converting the sensed steering angle into electrical angle signals;
   sensing a revolution speed of the engine and converting the sensed revolution speed into electrical revolution signals;
   determining whether said electrical velocity signal appropriately correspond to said electrical revolution signals;
   outputting data control signals corresponding to an optimum power steering hydraulic pressure computed in accordance with said electrical velocity signals and said electrical angle signals when said determining step determines appropriate correspondence; and outputting data control signals corresponding to a predetermined constant power steering hydraulic pressure when said determining step determines no appropriate correspondence, thereby maintaining a constant steering angle force with a constant power steering hydraulic pressure.

11. The method as claimed in claim 10, further comprising converting electrical signals corresponding to revolutions of an engine into voltages to be supplied to said determining step.

12. The method as claimed in claim 10, further comprising:

varying cycles of the data control signals by means of their voltages;

controlling, in accordance with the cycles of the data control signals, a coil current of a corresponding solenoid valve coil for a solenoid valve such that the coil current varies an opening degree of the solenoid valve; and controlling closing/opening of the solenoid valve in accordance with the data control signals output by said outputting steps.

13. The method as claimed in claim 12, wherein, said varying step includes feeding back a current flowing through said solenoid valve coil.

14. The method as claimed in claim 10, wherein, when said determining step determines no appropriate correspondence, said outputting step outputs data signals which are set independently of said electrical velocity signals and electrical angle signals.

15. The method as claimed in claim 10, wherein, if the electrical revolution signals equal a predetermined value and if the automobile runs at a velocity lower than said predetermined value, then said determining step determines that said automobile velocity sensing means is in the abnormal operating state.

* * * * *